G. M. GUERRERO.
Improvement in Platform-Switches.
No. 132,721. Patented Nov. 5, 1872.
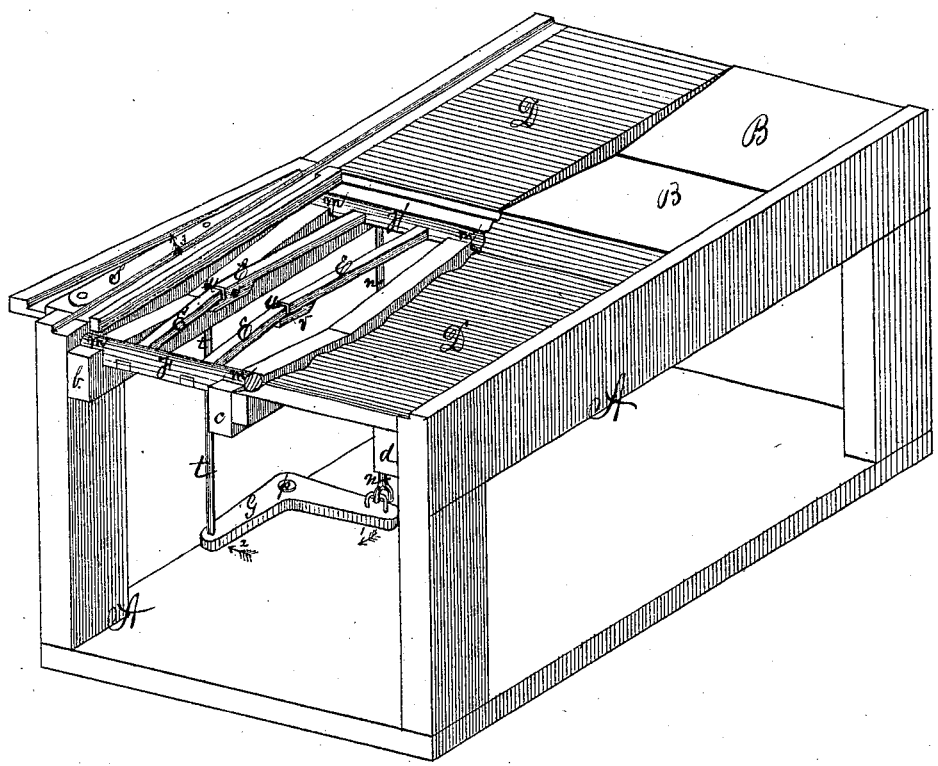
WITNESSES.
INVENTOR.

UNITED STATES PATENT OFFICE.

GUADALUPE M. GUERRERO, OF NEW ORLEANS, LOUISIANA.

IMPROVEMENT IN PLATFORM-SWITCHES.

Specification forming part of Letters Patent No. 132,721, dated November 5, 1872.

*To all whom it may concern:*

Be it known that I, GUADALUPE MANUEL GUERRERO, of the city of New Orleans and State of Louisiana, have invented a new, useful, and Improved Railroad-Switch; and I hereby declare the following to be a full, clear, and exact description of the same, reference being had to the drawing annexed which constitutes a part of this specification.

My improvement relates to a switch which is designed to be especially and exclusively applicable to street-railroads whereon the cars are propelled by animal power. My object is to render the draft animal or animals, as the case may be, available in the operation of the switches, thereby superseding the necessity for the employment of switch-tenders, which entail so much expense to railroad companies, besides being at times and in many respects unreliable. My improvement is of very simple and easy construction, inexpensive, and of positive and effective operation, as I have amply demonstrated by actual experiment.

My device will be clearly understood by reference to the drawing, whereon it is amply illustrated at Figure 1 by a perspective view of the whole device with the exception of one of the platforms, which is removed therefrom so as to expose to view the mechanical agencies by which my device is operated.

My improvement, as will be perceived by the said drawing annexed, consists of a substantial box-frame of a width to correspond with that of a single street-railroad track, and of a depth and length to be ample for the free operation of the device in actual practice. This frame is placed longitudinally with the track, and is furthermore provided with longitudinal and cross timbers sufficient to support in a substantial manner the flooring, stationary and movable, as well likewise as the other portions of my device, as hereinafter described.

A is the frame to which I have above made reference, while $b$, $c$, and $d$ are the longitudinal timbers which support the rocking platforms B, only two of which are shown, the other being removed for reasons hereinbefore stated. D are the permanent or stationary platforms, over which the draft animal passes in going in either direction. The rocking platforms B, aforesaid, over which also the draft animal passes, are secured rigidly upon the frames E, which latter are provided with articulated bearings $m$ at either end of the axles F F' of the frames E. One of these axles—namely, that of F', which is the central one—extends entirely across the under side of the track, and from one end of it is suspended a pendulum, $n$, which connects at its lower extremity with the bell-crank G, which is pivoted at $p$; and it is furthermore connected with the switch S, to be operated by means of a secondary pendulum, $t$. The frames E, aforesaid, separated at $u$, are made, however, practically continuous by means of the shoes $v$, as clearly shown on the drawing.

The operation of my device is effected by means of the draft animal being driven to the platform which is nearest the side of the direction in which the driver wishes to proceed forward. The weight of the animal will depress the platforms B, and with them the frames E upon which they are placed, and this depression will operate the main rock-shaft F', and, as a consequence thereof, will impart a corresponding motion to the pendulum $n$ suspended therefrom. This oscillating motion of the said pendulum $n$ will, it is obvious, operate the bell-crank G, and likewise the pendulum $t$, and finally the switch S, in the direction respectively indicated by the arrows, shown on the drawing in the order of their numbers, namely 1, 2, and 3. The operation of the switch in the direction indicated by the said arrows is effected by means of the animal being driven upon the platform shown upon the right side of the drawing, while its reversal in an opposite direction would necessarily be accomplished by the animal being driven in an opposite direction, and upon the platforms which cover the pendulum and bell-crank of the device.

An important and essential feature of my device consists in the necessity of invariably being compelled to drive the animal to the side of the track in which it is desired to proceed forward, as by this means the animal is naturally pulling the car against the side of the curve and in the proper direction for the car to proceed. In other devices hitherto invented, with which I am familiar, the draft animal is required to proceed to the opposite side from that indicated and above described.

Having described my invention, what I desire to secure by Letters Patent is the following claim:

Claim.

The main rock-shaft F', when placed at right angles with the track of a street-railroad, in combination with the pendulum n, bell-crank G, pendulum t, and switch S, and when these are operated by means of the hinged platforms B resting upon the frame E, and oscillating shaft F', substantially as described, and for the purposes set forth.

G. M. GUERRERO.

Witnesses:
    JOS. H. DE PRANG,
    H. N. JENKINS.